2,961,440

PROCESS FOR PREPARING INORGANIC STARCH ESTERS

Ralph W. Kerr, Riverside, and Frank C. Cleveland, Chicago, Ill., assignors to Corn Products Company, a corporation of Delaware No Drawing. Filed Jan. 23, 1956, Ser. No. 560,902

8 Claims. (Cl. 260—233.5)

This invention relates to the production of esters of starch or starch products and inorganic polybasic oxyacids.

The principal object of this invention is the production of the aforementioned esters. A further object is to provide a method for their production in substantially non-degraded form. Another object is to provide a method for simultaneously esterifying starch and decreasing its viscosity, i.e., rendering it thin boiling. Other objects will appear hereinafter.

Attempts have been made in the past to prepare inorganic esters of starch by treating starch with inorganic acids, e.g., sulfuric, but a starch ester either did not form or it was so highly degraded that the valuable characteristics of the starch molecule had been destroyed.

In our copending application Serial No. 576,524, filed April 6, 1956, now U.S. Patent 2,884,413, issued April 28, 1959 which is a continuation-in-part of application Serial No. 388,914, now abandoned, is described and claimed a method for making starch orthophosphate esters. Starch or starch derivatives containing about 2 to about 10 percent of moisture is heated in contact with a soluble phosphate salt, such as the metaphosphates, polymetaphosphates, pyrophosphates, tripolyphosphates, or mixtures of such salts at a temperature between about 100° C. and about 160° C., the pH being maintained within the range of about 4 and 11.5. After the heat treatment, the resultant ester is neutralized, washed and dried. It is believed that the reaction took place because of the fact that the reagent acted as an acid anhydride in much the same manner as organic acid anhydrides, such as acetic anhydride, enter into an exchange reaction with hydroxylated compounds, such as starch.

One disadvantage to this method is that the anhydro forms of the acids are relatively much more expensive than the ortho forms such as, for example, trimetaphosphate compared to orthophosphate, or pyrosulfate compared with orthosulfate. In some instances, the pyro, poly, or meta forms are unavailable in commercial quantities although the ortho acid forms, from which the polymeric forms may be produced by heating, are obtainable. Production of an anhydro form such as by heating sodium acid arsenate, for example,

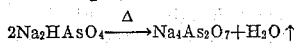

$$2Na_2HAsO_4 \xrightarrow{\Delta} Na_4As_2O_7 + H_2O \uparrow$$

to produce a pyroarsenate, would involve an additional manufacturing step in order to produce starch orthoarsenate, by the previously cited procedures.

We have now discovered that starch or starch products may be esterified to form ortho esters when heated with soluble acid salts of inorganic, polybasic acids which produce anhydro forms of these acids under specific conditions. Examples of such salts include the acid orthophosphates, orthoarsenates, orthosulfate, orthoborates.

In carrying out the invention, the salt is mixed with the starch or starch product. This may be done in any manner provided the mixture is uniform. Generally it is preferable to make a slurry in water of the starch and salt, filter the slurry and adjust the moisture content to the desired level before the heat treatment begins.

The temperature at which the starch is heated in contact with the aforementioned salt may vary from about 160° C. to about 200° C. Below about 160° C. the reaction proceeds so slowly as to be impractical and above about 200° C., it is difficult to heat starch without charring it. The pH during the reaction should not be allowed to exceed about 8.5. For practical reasons the starch salt mixture should not contain more than about 20 percent of moisture when the heat treatment is applied as it is difficult to handle such mixture, as, for example, stirring the mixture in the reaction vessel. It is believed that the anhydro form of the salt is not produced until the moisture content of the starch salt mixture is reduced to 5 percent or less. Under these reaction conditions, it is believed that the salts used produce anhydro forms of inorganic, polybasic oxy-acids according to the following equation, using phosphate as an example:

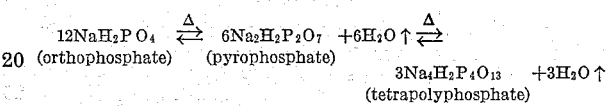

12NaH$_2$PO$_4$ $\xrightleftharpoons{\Delta}$ 6Na$_2$H$_2$P$_2$O$_7$ +6H$_2$O $\uparrow$ $\xrightleftharpoons{\Delta}$
(orthophosphate)   (pyrophosphate)
$\qquad\qquad\qquad\qquad\qquad$ 3Na$_4$H$_2$P$_4$O$_{13}$  +3H$_2$O $\uparrow$
$\qquad\qquad\qquad\qquad\qquad$ (tetrapolyphosphate)

It is, therefore, believed that our discovery, that starch may be esterified using acid salts of orthoacids at high temperatures, is explained by the hypothesis that under these conditions the anhydro form of the orthoacid (a pyro, poly, meta or polymeta form) is produced in small amounts, in situ, and as it is formed, it, in turn reacts with the starch in the manner of an acid anhydride to form the starch ester of the orthoacid. As the small amount of the anhydro form is removed by reaction with starch, the equilibria illustrated in the equation above are maintained by the production of more of the anhydro form from the ortho form so that in time very substantial proportions of the ortho form will have been condensed to anhydro forms, and the latter will have reacted with the starch.

It is to be pointed out, however, that whether or not the above hypothesis be correct is not a determining factor in practicing this invention. It has been discovered, in any event, that under specified conditions, orthoacid salts of inorganic polybasic oxyacids have, unexpectedly, been found to esterify starch.

The starch or starch product to be treated may be gelatinized or in granule form. If the starch has been gelatinized prior to the heat treatment, it is preferable to dry it as by roll or spray drying or other means before the heat treatment because of the difficulties involved in heating gelatinized starch at the temperatures specified. It is also preferable to avoid gelatinization of the starch before or during the heat treatment, especially to low D.S. levels, because the resultant ester is more easily purified when it is in granule rather than gelatinized form. Generally such products are readily purified by washing with water. When the products are soluble or in gelatinized state, they may be purified in known manner by treatment with solvents, such as alcohol, etc. Salts, such as Na$_2$SO$_4$, K$_2$SO$_4$, NaCl, may be added to the reaction mixture to raise the gelatinization temperature of the starch undergoing treatment.

The time of the reaction depends upon the amount of oxy-acid salt, moisture, and temperature. In general low temperatures, high moisture levels and low oxy-acid salt levels will require longer heating periods than when high temperatures, low moisture levels and high oxy-acid salt levels are used.

The terms "starch" and "starch products," as used herein, are intended to include all varieties of starch, for example, corn, grain sorghum, tapioca, waxy maize in unmodified form as well as the modified forms, e.g., thin boiling starches made by acid or enzyme modification or by oxidation and also any starch derivative having at least one reactive hydroxy group. The latter include particularly starch ethers and esters, e.g., hydroxyethyl starch, starch acetate. It is also possible by means of our invention to prepare certain mixed esters of starch and polybasic, inorganic oxy-acids.

By carrying out the reaction while maintaining the pH at an acidic level, it is possible to produce in one reaction procedure an ester which is thin boiling. Generally the pH should not be below about 4.0 to produce thin boiling products since it is difficult to control hydrolysis of starch below this pH at the temperatures specified. However, where starch degradation into the range of dextrin like products during esterification is desirable or permissible, the pH may be lower.

The following examples, which are intended as typical and informative only and not in a limiting sense, will illustrate the process of this invention:

EXAMPLE 1

*Esterification of corn starch with orthophosphate at various pH levels*

In Experiment A, 162 grams of corn starch (one molar weight) was stirred into 240 ml. of water into which had been dissolved 27.6 grams of $NaH_2PO_4 \cdot H_2O$ (0.2 mole) and sitrred for 30 minutes. The slurry showed a pH of 4.65. The slurry was filtered and the cake air-dried to a moisture content of 5.7 percent. It was found that the mixture contained 12.1 grams of $NaH_2PO_4$ or approximately 0.1 mole. The powdered product was heated, with stirring for 30 minutes at at temperature of 160° C. The product was cooled, washer by suspension in 500 ml. of water, filtered by suction and washed on the filter with two portions of 200 ml. water. The product was further purified by resuspending the cake in 300 ml. of water, adjusting the pH level to 7.0 with NaOH, filtering by suction and again washing on the filter with water. The starch product was dried and analyzed with results as shown in Table II.

In Experiments B to J an identical procedure was used except that combinations of the soduim orthophosphates, $NaH_2PO_4$, $Na_2HPO_4$ or $Na_3PO_4$, shown in Table I, were employed to obtain the slurry make-up pH values shown in Table II and always adding to the slurry a total of 0.2 mole of orthophosphate.

TABLE I

| | $NaH_2PO_4 \cdot H_2O$ | $Na_2HPO_4$ | $Na_3PO_4 \cdot 12H_2O$ |
|---|---|---|---|
| A | 27.6 | 0 | 0 |
| B | 26.2 | 1.48 | 0 |
| C | 23.2 | 4.80 | 0 |
| D | 17.6 | 10.30 | 0 |
| E | 14.55 | 13.45 | 0 |
| F | 6.0 | 22.0 | 0 |
| G | 2.87 | 26.86 | 0 |
| H | 0 | 28.4 | 1.0 |
| I | 0 | 24.0 | 12.0 |
| J | 0 | 0 | 76.0 |

Allowance was made for the water in the hydrates in adding the total of 0.2 mole phosphate in each case.

TABLE II

| | Make-up Slurry, pH | First Wash of Product, pH | Scott Viscosity [a] sec./100 ml. | P, percent |
|---|---|---|---|---|
| A | 4.65 | 4.95 | 22 | 0.42 |
| B | 5.0 | 5.2 | 23.5 | 0.43 |
| C | 5.5 | 6.0 | 29.5 | 0.45 |
| D | 6.1 | 6.7 | 62 | 0.38 |
| E | 6.8 | 6.9 | 65 | 0.29 |
| F | 6.9 | 7.6 | 208 | 0.19 |
| G | 7.4 | 8.0 | 165 | 0.15 |
| H | 8.5 | 8.5 | 125 | 0.078 |
| I | 10.0 | 10.2 | 88 | 0.031 |
| J | 11.6 | 11.3 | 34.5 | 0.01 |
| Untreated, native corn starch | | | 40 | 0.04 |

[a] Using 10 grams of starch at 12 percent moisture per 280 ml. of water.

It will be observed that at pH 11.6, where the phosphate is substantially all in the basic form, $Na_3PO_4$, substantially no reaction was observed in 30 minutes at 160° C. However, as the acidity was increased (at least to pH 5.5) and the phosphate progressively became:

$$Na_3PO_4 \rightarrow Na_2HPO_4 \rightarrow NaH_2PO_4$$

esterification of the starch increased, although the $PO_4$ concentration was maintained constant. It is believed that pH levels less than 5.5 favor the further production of the active condensed form from the ortho form and for this reason it might be anticipated that a higher degree of esterification should be obtained at these lower pH levels. However, from our work with the condensed phosphates, it is known that increasing acidity progressively retards the actual esterification. The net result of these two opposing effects is a slight falling off in esterification at pH levels below about pH 5.5.

It is to be remembered that in treating polysaccharides such as starch under acidic conditions, the effect of acidity on hydrolysis of the glycosidic linkages of the starch molecule must be taken into consideration. This is particularly important, the higher the reaction temperature and the longer the time. The effect of glycosidic hydrolysis is to reduce the paste viscosity of the product. Thus, in Example 1, although phosphorylation increased progressively with increased acidity, up to a value represented by pH 5.5 viscosity of the product increased only until the pH level of the make-up mixture had been reduced to 6.9 and the viscosity of the product remained in the supernomal range only when this pH level was held above about pH 6.0, using subsequent reaction conditions of 30 minutes at 160° C.

For many industrial uses, starch products of reduced viscosity are required. These uses are, for example, the sizing of warp yarns and other textile materials and the surface sizing of paper. Therefore, whether or not a pH at the lower level of the range specified is chosen for the reaction make-up will be determined in part by the end use of the product.

Example 1, therefore, not only outlines the production of a super-viscosity corn starch phosphate ester (F) but also shows that by choice of conditions a technically important grade of thin-boiling corn starch phosphate may be produced directly. The product resulting from a make-up at pH 4.65 in Experiment A had a paste viscosity equal to a 75-fluidity, commercial grade of thin-boiling starch. This result is a distinct advantage for this process since in the great majority of starch derivatization processes, the starch must be additionally treated, with enzymes, acids or oxidants to reduce the viscosity of the derivative to industrially usable levels.

Obviously a wide range of fluidity grades of starch phosphates may be prepared by the procedure of Example 1, depending on the proportions of $$Na_2HPO_4 : NaH_2PO_4 : Na_3PO_4$$

used, the temperature and the time of reaction. And it will also be obvious in view of other examples which are given, that by employing the principles disclosed in Example 1 thin-boiling grades of starch esters of other oxy-acids may be made directly by choice of the acid salt, temperature and time.

EXAMPLE 2

*Reaction of corn starch with sodium acid phosphate to produce a cold water dispersible corn starch phosphate*

One thousand pounds of corn starch was added to 1,340 pounds of water into which had been dissolved 134 pounds of sodium dihydrogen phosphate monohydrate, $NaH_2PO_4 \cdot H_2O$, and 22.8 pounds of disodium hydrogen phosphate, $Na_2HPO_4$. The pH value of the slurry was 5.5.

The slurry was filtered and the cake air-dried to a moisture content of 9.8 percent. The powdered product was heated with agitation to 160° C. over a period of about 100 minutes in a reactor vented for moisture removal and was held at 160° C. for 2 hours, with agitation. The product was cooled and was found to have a total ash content of 6.3 percent, dry basis, and to disperse in cold water to form a thick bodied paste.

When 15 grams of the product of this example was stirred into 473 ml. (one pint) of water at 80° F. for 10 minutes with a Hamilton Beach stirring mixer, a translucent paste resulted which when placed in a Scott viscosity cup at 80° F. showed a viscosity of 60 seconds per 100 ml.

This product was tested as a laundry size, more particularly, as an automatic, home washer laundry size. Six ounces of the powder was added through the detergent supply line to a 9 pound load of clothes in the fiinal rinse cycle of a Bendix automatic home washer. When the garments were dried and ironed and compared with garments identically treated at several concentration levels with a commercial, cold water dispersible laundry starch, it was found that it was necessary to add approximately 12 ounces of the latter starch per 9 pound load of clothes to obtain the same sizing value as was obtained with 6 ounces of the product of Example 2. That is to say, the starch phosphate produced in accordance with Example 2 was 100 percent more effective as a sizing agent compared to a cold water dispersible laundry starch now on the market. Thus, as has been shown, the product of Example 2 obviously need not necessarily be purified but may be used as it leaves the reactor. This is true for many other uses also. For example, when this starch product was added to paper pulp at the beaters in a ratio of 2 pounds per 100 pounds of pulp, the Mullen test for strength of paper sheet formed was found to have increased 75 percent.

For analysis, a small portion of the product of Example 2 was purified as follows: 50 grams was stirred into 400 ml. of 50 percent by volume aqueous methanol, filtered by suction and washed on filter with 400 ml. of 50 percent methanol. The filter cake was extracted overnight in 400 ml., 45 percent by volume aqueous methanol and filtered. This procedure was repeated three additional times, finally washing the cake on the filter on the last filtration with methanol. The product was then air-dried.

Phosphorus content of the purified product was 1.18 percent, dry basis, which is equivalent to 3.5 percent phosphate groups.

EXAMPLE 3

*Reaction of corn starch with sodium acid phosphate at 200° C., to product a cold water dispersible starch phosphate of high viscosity*

One hundred grams, dry basis, corn starch was suspended in 150 ml. of water into which the following has been dissolved: 13.6 grams $NaH_2PO_4$; 2.3 grams $Na_2HPO_4$ and 0.028 gram of a water soluble blue dye. This dye was a mixture of equal parts of dyes sold under the designation Alizarine Brilliant Sapphire R and Acid Fast Violet B G Conc. 200% by National Aniline Div. of Allied Chemical and Dye Corporation. The slurry showed pH 5.4. The slurry was filtered by suction and the cake had a moisture content of 40 percent. The cake was dried to 3.1 percent moisture content and by analysis was found to contain 4.94 percent total ash. The phosphorus content was 1.17 percent, dry basis.

The dry, powdered starch and phosphate reaction mixture was heated with stirring in a metal reactor immersed in a heated oil bath. The temperature of the starch rose to 200° C. over a period of 14.5 minutes. After one half minute at 200° C., the starch was rapidly cooled, with circulating cold water in an outer jacket, to room temperature.

When 15 grams of this product was stirred into 473 ml. of water at 80° F. for 10 minutes with a Hamilton Beach stirring mixer, a thick translucent paste formed which when placed in a Scott viscosity cup at 80° F. showed a viscosity of 1200 seconds per 100 ml. This product is considerably thicker, therefore, than the product of Example 2.

When 30 grams of this product was dry blended with 1.5 grams of very finely powdered boric acid and the mixture added to one quart of cold water, then on shaking for approximately 30 seconds, the product rapidly dispersed in the water to give a very smooth blue colored starch paste. This starch paste was compared against conventional liquid laundry starches which may be purchased in grocery stores under various trade marks. Comparison was made by diluting the liquid products with an equal volume of water and by immersing fabrics in the diluted sizes, following which the fabrics were wrung dry, and ironed. It was found that the product of this example compared with the best of the conventional liquid laundry starches as to stiffening value, appearance of ironed fabrics in respect to gloss and lack of masking, and the ease of ironing due to freedom from sticking. Obviously, the dry powder, as made above, may be used by the ultimate consumer to prepare a conventional, concentrated liquid laundry starch simply by shaking a small amount of the dry product with cold water.

A portion of the product of this example was prepared for analysis as follows: 15 grams (at 3.8% moisture) were stirred for 10 minutes in 473 ml. of cold water and the dispersion was dialyzed in cellophane tubing against running deionized water for 48 hours. Thereupon, the salt free paste was lyophilized to dryness. Actual yield recovered was 14.04 grams, dry basis. Analysis showed 1.00 percent phosphorus, dry basis, which is equivalent to a starch ester containing 3 percent phosphate groups.

The results show an unanticipated phosphorylation efficiency, under the conditions used, of 86 percent. They show furthermore that the product leaving the reactor contained not more than 0.66 percent of free sodium phosphate and was sufficiently pure, as sodium starch phosphate, without any purification, for substantially all uses.

To provide a process for the production of a starch derivative that is substituted to the degree that it is cold water dispersible and substantially non-degraded, and that is sufficiently pure so that further purification is not necessary, is a tremendous advance in the art. Washing with water a low D.S., water insoluble starch derivative materially adds to the cost; purifying a cold water dispersible starch product is not only a technically difficult job, but in most cases results in a prohibitive sales price.

EXAMPLE 4

*Reaction of waxy grain sorghum starch with sodium acid phosphate to produce a cold water dispersible starch phosphate*

The procedures outlined in Example 2 were repeated with the exception that waxy grain sorghum starch was used instead of corn starch. A cold water dispersible starch phosphate was produced comparable in properties to the product of Example 2 with the exception of a somewhat reduced viscosity. Apparently waxy starch is more susceptible to glycosidic hydrolysis at pH 5.5, under the conditions used than is corn starch.

EXAMPLE 5

*Production of waxy sorghum starch phosphate in the unswollen granule form*

Procedures given in Example 1 were repeated with the following variations: 162 grams, dry basis, of waxy sorghum starch was stirred in 240 ml. of water into which had been dissolved 10 grams of $Na_2HPO_4$ and 8.4 grams of $NaH_2PO_4 \cdot H_2O$. The pH of this slurry was 6.5. The slurry was filtered and the cake, containing approximately 0.1 mole of orthophosphate, was air-dried at 50° C. to approximately 5 percent moisture content. The powdered mixture was heated with stirring at 160° C. for 60 minutes, then cooled, suspended in 500 ml. of water and filtered. The product was further washed by resuspension in 500 ml. of water stirring for 30 minutes, filtering by suction and drying. This product was in the unswollen granule state.

When the product was gelatinized by heating in water, an extremely viscous, and very clear sol with characteristics quite similar to natural gums was formed. The Scott viscosity, using 12 grams on a 12 percent moisture basis in 280 ml. of water, was 420 seconds per 50 ml. at pH 6.6. The untreated waxy sorghum starch, for comparison, had a Scott viscosity of only 110 seconds per 50 ml. when determined under the same conditions.

A small sample of the waxy sorghum starch phosphate was further purified for analysis by methanol extraction. Analysis for phosphorus showed 0.38 percent or the presence of 1.15 percent phosphate ester groups on the carbohydrate.

EXAMPLE 6

*Reaction of corn starch with potassium acid arsenate to produce a starch arsenate ester*

One molar weight of corn starch (162 grams, dry basis) was stirred in 200 ml. of water into which had been dissolved 36 grams (0.2 moles) of potassium dihydrogen arsenate, $KH_2AsO_4$, and sufficient alkali to adjust the slurry to pH 6.7. The mixture was filtered and the cake air-dried to approximately 7 percent moisture content. It was found that the starch cake had taken up approximately half of the added orthoarsenate or about 0.1 mole.

The powdered mixture was heated with stirring to 160° C. and held at this temperature for 30 minutes. After cooling to room temperature the product was washed by stirring into one liter of water and filtered. The cake was resuspended in 200 ml. of water, filtered by suction and washed on the filter with three, 100 ml. portions of water. The cake was reslurried in water filtered by suction and washed on the filter with 500 ml. of water.

The product contained 1.3 percent arsenic, dry basis, which is equivalent to 2.4 percent orthoarsenate ester groups on the carbohydrate molecule.

This product was stained a deep blue when suspended in 0.1 percent aqueous solution of the basic dye, methylene blue, filtered and thoroughly washed with water, showing that acidic, arsenate groups had been introduced into the starch molecule. Untreated corn starch showed substantially no staining in comparison when treated identically with methylene blue.

EXAMPLE 7

*Sulfation of starch with sodium orthosulfate*

162 grams of corn starch was stirred into 220 ml. of water into which had been dissolved 27.6 grams

$$NaHSO_4 \cdot H_2O$$

and sufficient NaOH to give a final slurry pH value of 6.0. The slurry was filtered and the cake was dried to 10 percent moisture content.

The powdered reaction mixture was heated with stirring at 160° C. for one hour, was cooled and stirred into 300 ml. of water. The slurry was filtered by suction and the cake washed on the filter with two, 400 ml. portions of water.

The cake was stirred into 300 ml. of water and the pH, now 7.5, was adjusted to pH 6.5 with HCl. The slurry was filtered by suction and washed on the filter with 400 ml. of water. The product was air-dried for analysis, which showed 0.22 percent sulfate groups.

In performing the above example, it was noted that a slurry of the starch in water with $NaHSO_4$ alone was pH 1.8. Obviously, therefore at pH 6.0 only a very small proportion of the orthosulfate is in the form $NaHSO_4$, which explains the less efficient esterification efficiency of sodium orthosulfate compared to that of sodium orthophosphate at this pH level. According to our theory, proposed above, the acid form of the salt is required for the reaction, or series of reactions to take place leading to the formation of the starch ester.

In an experiment were $NaHSO_4$ was heated with starch at its normal pH value, a very highly degraded dextrinous mass resulted within a short time.

EXAMPLE 8

*Esterification of starch with orthoborate*

It was observed that when 12.36 grams (0.2 mole) of orthoboric acid was dissolved in water at 40° C. and 162 grams, dry basis, corn starch was stirred into this solution to form a slurry at 30° C., the pH value of this mixture was 3.4. This acid condition was taken to indicate that a complex had formed between the carbohydrate and boric acid in which one of the three acidic hydrogens in the orthoboric acid had become ionizable, in part at least.

Accordingly, normal sodium hydroxide was added dropwise with stirring to the mixture until the pH value was 6.0. Ten milliliters of the sodium hydroxide were required. Under these conditions, it is believed that the sodium acid salt of the boric acid was present.

The mixture was filtered and air-dried to about 4 percent moisture content. Only 5.3 grams of the added boric acid was found in the filtrate.

The dried mixture was heated at 160° C. for 30 minutes, cooled and washed with water as follows: Reaction mixture was stirred into 500 ml. of water at 40° C. and after 5 minutes was filtered by suction. The pH value of the slurry was 7.2. The filter cake was washed on the filter with two, 200 ml. portions of water at 40° C. The filter cake was resuspended in 500 ml. of water at 40° C. adjusted to pH 7.0 with dilute HCl, held 15 minutes at 40° C. and then filtered by suction. The starch cake was washed on the filter with two 200 ml. portions of water at 40° C.

To insure purity of product for analytical purposes, the product was extracted three separate times by stirring in 500 ml. of methanol followed by filtration. The cake was air-dried.

Analysis for boron showed 0.27 percent, dry basis. Calculated D.S. (degree of substitution) was 0.041 which is equivalent to approximately one orthoborate ester group per 25 glucose units in the starch molecule. This D.S. level is approximately that at which substituent groups begin to exert a pronounced effect on the colloidal properties of aqueous dispersions of starch derivatives and thereby greatly enhance their use (when gelatinized in water) for many applications, such as, for example, for textile and paper sizes, suspending agent for suspensoids (such as, for example, clays, inorganic pigments and carbon) emulsifiers, thickening agents for aqueous systems and adhesives.

The starch borate produced in Example 8 was heated in water to boiling. The starch granules swelled and then tended to collapse and disintegrate in more or less normal fashion. However, an exceptionally low viscosity sol resulted with a 12 gram Scott viscosity of only 27.5 seconds per 100 ml. This lowered viscosity cannot be attributed to cross-linking because the granules swelled and disintegrated on heating in water and the paste did not have the characteristic opacity of cross-linked starches. Neither could the greatly reduced viscosity be attributed to hydrolytic degradation of the starch in the pH range employed in this example which was 6.0 to 7.2. Corn starch heated at pH 6.0, but without added boric acid and NaOH, for 30 minutes at 160° C. did not show an appreciable reduction in viscosity when gelatinized by heating in water.

The action is no doubt due to the substitution of the less hydrophilic boric acid groups for the original, highly hydrophilic hydroxyls on the starch molecule.

EXAMPLE 9

*Use of starch borate as an improved laundry starch*

Forty grams of starch borate, as produced according to Example 8, was stirred into a quart of water and mixture brought to a boil to gelatinize the starch. The paste was diluted with a quart of cold water and compared as a laundry starch for colored fabrics with conventional home laundry starches. The sized fabrics were wrung dry and ironed. Drops of water were then placed on the ironed fabrics and after the drops had been taken up by the cloth, the fabrics were ironed a second time. Colored garments sized with conventional home laundry starches showed a distinctly visible ring where the drops of water had soaked into the sized garments. These marks were of variable intensity depending on the brand of laundry starch used. In laundry work, this effect is called "water-spotting" and is obviously objectionable. However, colored garments sized with the starch borate showed no discernible "water-spotting." Moreover, colored garments sized with starch borate showed better penetration of size into the fabric and less masking of the natural color of the fabric than garments sized with unmodified corn starch.

EXAMPLE 10

*Mixed esters of starch and polybasic, inorganic oxy-acids*

Additionally, mixed esters of starch and polybasic, inorganic oxy-acids may be made directly in the processes of this invention, by using selected mixtures of the acid salts of the oxy-acids. By way of example, when a slurry was made up of 162 grams of corn starch in 200 ml. of water into which had been dissolved, 0.15 mole of $Na_2HPO_4$ and 0.2 mole of $NaHSO_4$ at pH 6.7, the slurry filtered and the cake dried and heated at 160° C. for one hour, it was found by analysis when this product was thoroughly washed with water, that the starch ester contained 0.9 percent phosphate ester groups and 0.15 percent sulfate ester groups. When gelatinized by heating in water, a clear very viscous sol resulted, with a Scott viscosity too high to measure on the usual basis of 12 grams in 280 ml. of water. Using 5 grams in 280 ml. of water the Scott viscosity was 94 seconds per 100 ml.

We claim:

1. A process for the preparation of inorganic ortho esters of starch which comprises commingling ungelatinized starch with an aqueous solution of a water-soluble acid salt of an inorganic polybasic oxyacid in the ortho form, in such proportions that the amount of said salt incorporated in said starch is about 5 to 11 percent, based on starch, dry basis, removing unabsorbed liquid from the treated starch by drying at a temperature below the point at which the starch gelatinizes, and heating the dried mixture of starch and salt until the salt reacts with the starch to form starch ortho ester.

2. A process according to claim 1 wherein said salt is an orthophosphate.

3. A process according to claim 1 wherein said salt is an orthoarsenate.

4. A process according to claim 1 wherein said salt is an orthosulfate.

5. A process according to claim 1 wherein said salt is an orthoborate.

6. A process according to claim 1 wherein said salt is a mixture of salts of inorganic, polybasic oxyacids in the ortho form.

7. A process according to claim 1 wherein said starch undergoing treatment is in unswollen, granule form and the heat treatment is carried out without gelatinizing the starch.

8. A process according to claim 1 wherein a gelatinization depressant is present during the heat treatment.

References Cited in the file of this patent

UNITED STATES PATENTS

| | | |
|---|---|---|
| 910,524 | Fritsche | Jan. 26, 1909 |
| 2,009,692 | Hall | July 30, 1935 |
| 2,171,796 | Kelling | Sept. 5, 1939 |
| 2,590,912 | Yarber | Apr. 1, 1952 |
| 2,806,026 | Evans | Sept. 10, 1957 |
| 2,824,870 | Neukom | Feb. 25, 1958 |
| 2,884,412 | Neukom | Apr. 28, 1959 |
| 2,884,413 | Kerr et al. | Apr. 28, 1959 |

UNITED STATES PATENT OFFICE
CERTIFICATE OF CORRECTION

Patent No. 2,961,440　　　　　　　　　　　　November 22, 1960

Ralph W. Kerr et al.

It is hereby certified that error appears in the printed specification of the above numbered patent requiring correction and that the said Letters Patent should read as corrected below.

Column 3, line 32, for "washer" read -- washed --; column 4, line 31, for "supernomal" read -- supernormal --; column 5, line 52, for "product" read -- produce --.

Signed and sealed this 25th day of April 1961.

(SEAL)
Attest:

ERNEST W. SWIDER
Attesting Officer

DAVID L. LADD
Commissioner of Patents